(12) United States Patent
Kriz, II

(10) Patent No.: US 10,486,669 B2
(45) Date of Patent: Nov. 26, 2019

(54) METHOD OF ASSEMBLING A POWER BRAKE ASSEMBLY

(71) Applicant: BWI (Shanghai) Co., Ltd., Pudong, Shanghai (CN)

(72) Inventor: Richard James Kriz, II, Fort Wayne, IN (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 759 days.

(21) Appl. No.: 14/992,286

(22) Filed: Jan. 11, 2016

(65) Prior Publication Data

US 2016/0229472 A1    Aug. 11, 2016

Related U.S. Application Data

(60) Provisional application No. 62/114,198, filed on Feb. 10, 2015.

(51) Int. Cl.
| | |
|---|---|
| *B60T 11/22* | (2006.01) |
| *B60T 11/16* | (2006.01) |
| *B60T 13/567* | (2006.01) |

(52) U.S. Cl.
CPC .............. *B60T 11/16* (2013.01); *B60T 11/22* (2013.01); *B60T 13/567* (2013.01); *Y10T 29/49778* (2015.01)

(58) Field of Classification Search
CPC ........ B60T 11/16; B60T 13/567; B60T 11/22; Y10T 29/49778
See application file for complete search history.

(56) References Cited

U.S. PATENT DOCUMENTS

| | | |
|---|---|---|
| 3,064,433 A | 11/1962 | Cripe |
| 4,096,696 A | 6/1978 | Van House |
| 4,307,570 A | 12/1981 | Yardley |

(Continued)

FOREIGN PATENT DOCUMENTS

| | | |
|---|---|---|
| EP | 0020256 A1 | 12/1980 |
| EP | 0158005 A1 | 10/1985 |

(Continued)

OTHER PUBLICATIONS

Preliminary Search Report dated Mar. 13, 2019 for counterpart French patent application No. 1650936.

*Primary Examiner* — Sarang Afzali
*Assistant Examiner* — Ruth G Hidalgo-Hernandez
(74) *Attorney, Agent, or Firm* — William H. Honaker; Dickinson Wright PLLC

(57) ABSTRACT

A method of assembling a power brake assembly including a brake booster and a master cylinder defining a chamber disposed between at least one reservoir port and at least one brake line port begins by inserting the master cylinder into the brake booster. The method proceeds by monitoring for a pressure differential between the at least one reservoir port and the at least one brake line port of the master cylinder during the insertion step, and then ceasing insertion of the master cylinder into the brake booster in response to sensing a pressure differential. The method proceeds by withdrawing the master cylinder a distance from within the brake booster; and securing the brake booster to the master cylinder after retracting the master cylinder the distance.

15 Claims, 9 Drawing Sheets

(56) References Cited

U.S. PATENT DOCUMENTS

| | | |
|---|---|---|
| 4,400,942 A * | 8/1983 | Reinartz ............... B60T 13/565 |
| | | 60/547.1 |
| 4,409,885 A | 10/1983 | Reinartz et al. |
| 4,545,206 A | 10/1985 | Kobayashi |
| 4,685,299 A | 8/1987 | Myers et al. |
| 5,233,833 A | 8/1993 | Last, Jr. et al. |
| 5,359,854 A | 11/1994 | Wagner et al. |
| 7,104,179 B2 | 9/2006 | Reboh et al. |
| 2002/0124390 A1 | 9/2002 | Vermoesen et al. |
| 2004/0182238 A1 | 9/2004 | Mita |
| 2007/0056438 A1 | 3/2007 | Attard et al. |
| 2012/0055150 A1 | 3/2012 | Mackiewicz |
| 2014/0246897 A1 | 9/2014 | Miyata et al. |

FOREIGN PATENT DOCUMENTS

| | | |
|---|---|---|
| EP | 0217709 A2 | 4/1987 |
| EP | 0614427 A2 | 9/1994 |
| EP | 1693264 A1 | 8/2006 |
| FR | 2443954 | 7/1980 |
| JP | 2005335699 A | 12/2005 |
| WO | 2012079900 A1 | 6/2012 |

* cited by examiner

METHOD OF ASSEMBLING A POWER BRAKE ASSEMBLY

CROSS REFERENCE TO RELATED APPLICATION

The subject application claims priority to U.S. Provisional Patent Application Ser. No. 62/114,198 filed on Feb. 10, 2015, the entire disclosure of which is incorporated herein by reference.

BACKGROUND OF THE INVENTION

1. Field of the Invention

The present invention relates to a method of assembling a power brake assembly including a master cylinder and a brake booster.

2. Description of the Prior Art

Vehicles often include a hydraulic or power braking system for reducing the speed of the vehicle and/or maintaining the vehicle in a stopped position. Typically, the power braking systems include a brake booster having an output rod, which is received by a master cylinder. Hydraulic brake lines fluidly couple the master cylinder to one or more hydraulic brake wheel cylinders. The brake booster receives a pedal rod, which is coupled to a brake pedal positioned within a cabin of the vehicle. In operation, the brake booster reduces the force required to activate the braking system by amplifying a force exerted on the brake pedal by an operator of the vehicle. The brake booster transmits the amplified force through the output rod to one or more pistons disposed within the master cylinder. Movement of the pistons within the master cylinder provides fluid under pressure to each brake wheel cylinder through the hydraulic brake lines.

The pistons within the master cylinder typically include bypass apertures that must be closed off or covered by seals in order to develop the pressurized fluid which is provided to each brake wheel cylinder. Because of dimensional variations in the master cylinder and brake booster, the seals and bypass apertures are positioned a distance from one another. This distance, known in the art as travel-to-close, must be traveled by either the piston and/or the output rod before the pressurized fluid in the master cylinder is developed. As such, this distance gives rise to pedal travel which affects the pedal feel for an operator of the vehicle. Accordingly, methods of assembling power brake assemblies have made various attempts to reduce this distance or travel-to-close to improve pedal feel.

One method of assembling a power brake assembly is disclosed in U.S. Pat. No. 4,400,942. The method of assembly includes the insertion of a master cylinder into the brake booster, after which a tubular collar of the brake booster is crimped about a radial shoulder of the master cylinder to secure the master cylinder to the tubular collar. However, any method disclosed in U.S. Pat. No. 4,400,942 is not concerned with controlling pedal travel loss either before or after securing the master cylinder to the brake booster.

Other methods of assembling the power brake assembly attempt to control pedal travel by axially adjusting the output rod of the brake booster during assembly to prevent the piston of the master cylinder from being too far back in a chamber of the master cylinder and thus far away from the output rod. One example is disclosed in US Patent Application Serial No. 2002/0124390 in which the method of assembly includes adding and longitudinally positioning a cap on the output rod for allowing the cap to narrow a gap between the output rod and the piston of the master cylinder. Other methods of adjusting distances between components of the power brake assembly occur after the master cylinder and brake booster have already been secured relative to one another. One such example is disclosed in U.S. Pat. No. 4,545,206 which discloses an apparatus for adjusting a magnitude of clearance between a reaction disc and a reaction transmitting member of the power brake assembly. However, the aforementioned methods of controlling pedal travel loss can be very cumbersome and time-consuming.

SUMMARY OF THE INVENTION

The invention provides for a method of assembly a power brake assembly which includes monitoring for a pressure differential between the reservoir ports and the brake line ports of the master cylinder during insertion of the master cylinder into the brake booster. Once a pressure differential is sensed, the method proceeds by ceasing insertion of the master cylinder into the brake booster. The master cylinder is then retracted or withdrawn a distance from within the brake booster and the brake booster is secured to the master cylinder to complete assembly of the power brake system.

ADVANTAGES OF THE INVENTION

The present method provides a more efficient and convenient method of assembling the power brake assembly by eliminating the need for special fixtures and/or tools, such as a cap positioned on an output rod, to control or minimize pedal travel loss. Specifically, the present invention provides the advantage of determining the optimum position of the master cylinder relative to the brake booster by merely applying and monitoring a pressure differential between the reservoir ports and the brake line ports of the master cylinder during assembly of the power brake system. Accordingly, the subject method optimizes the assembled power brake by reducing or minimizing the distance or length that must be traveled by the pistons during operation before pressurized fluid is developed within the chamber of the master cylinder. As such, the subject method results in a power brake assembly with minimized pedal travel that improves the pedal feel for an operator of the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
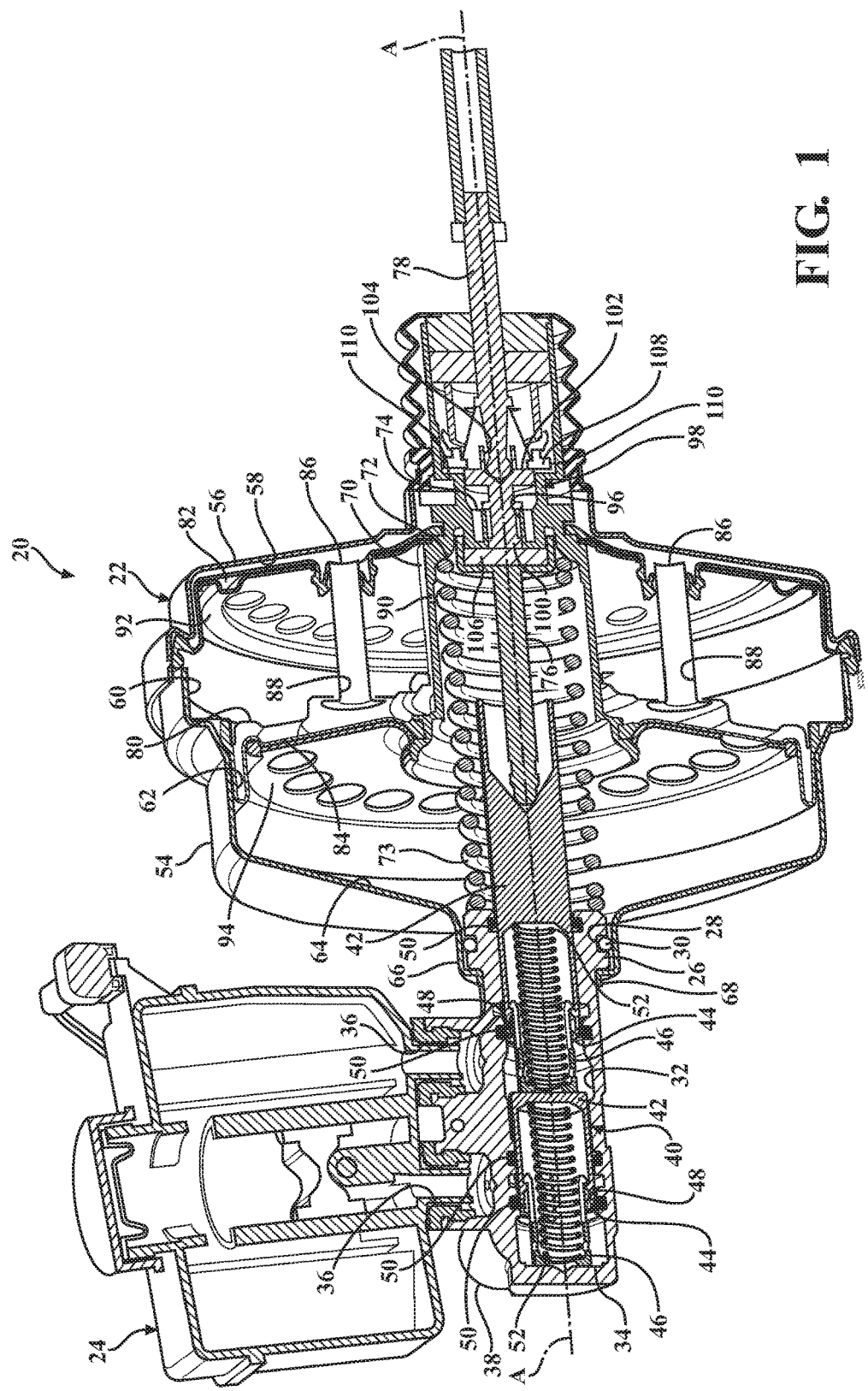
FIG. 1 is a cross-sectional perspective view of a power brake assembly including a master cylinder and a brake booster in its assembled state.

Referring to the Figures, wherein like numerals indicate corresponding parts throughout the several views, a method for assembling a power brake assembly 20 is generally illustrated and shown in FIGS. 2 through 8. The power brake assembly 20, as generally shown in FIG. 1 in its assembled state, includes a brake booster 22 attached to a brake pedal (not shown) and a master cylinder 24 connected to a plurality of fluid actuated brakes (not shown).

The master cylinder 24 is disposed along a center axis A and defines a radial shoulder 26 extending annularly about the master cylinder 24. The radial shoulder 26 of the master cylinder 24 defines a recess 28 extending annularly about the radial shoulder 26 and an o-ring 30 is disposed in the recess 28. The master cylinder 24 also includes a chamber 32 having a cylindrical shape defining a bottom 34 disposed along the center axis A. The master cylinder 24 further includes at least one reservoir port 36 disposed in fluid communication with the chamber 32 for containing and transferring a braking fluid. The master cylinder 24 further includes at least one brake line port 38 disposed in fluid communication with the chamber 32 for communicating the braking fluid from the chamber 32 of the master cylinder 24 to the fluid actuated brakes.

At least one controller 40 is slidably disposed in the chamber 32 of the master cylinder 24 and extends along the axis A for transferring the braking fluid from the chamber 32 and through the at least one brake line port 38 to the fluid actuated brakes. The controller 40 includes at least one piston 42 having a cylindrical shape disposed along the axis A and being hollow from a distal end 44 and a retainer 46 disposed in telescoping relationship with the distal end 44 of the corresponding at least one piston 42. The piston 42 defines at least one bypass aperture 48 adjacent to the distal end 44 to allow braking fluid to flow therethrough. The master cylinder 24 defines at least one inlet port 49 disposed annularly about the chamber 32 and disposed between the at least one bypass aperture 48 and the reservoir port 36 to establish fluid communication therebetween. At least one gasket 50 is disposed in the chamber 32 of the master cylinder 24 and extends annularly about the piston 42 and is disposed next adjacent the at least one bypass aperture 48.

Figure 5:
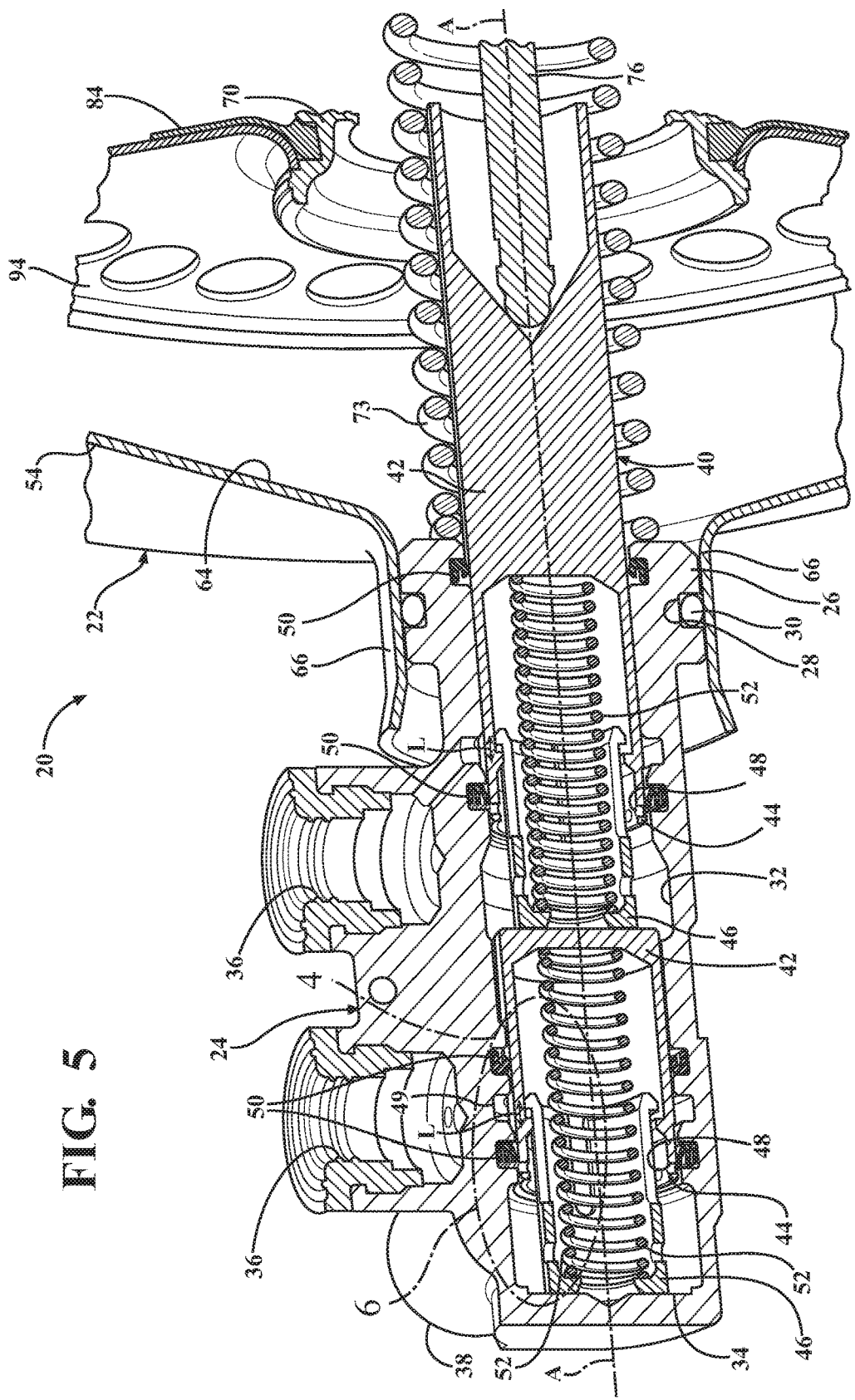
FIG. 5 is a fragmentary cross-sectional perspective view of the power brake assembly illustrating a piston of the master cylinder disposed in engaging relationship with an output rod of the brake booster during the insertion step to cease fluid flow through a bypass aperture of the piston and establish a pressure differential between the brake line ports and the reservoir ports of the master cylinder.
Figure 6:
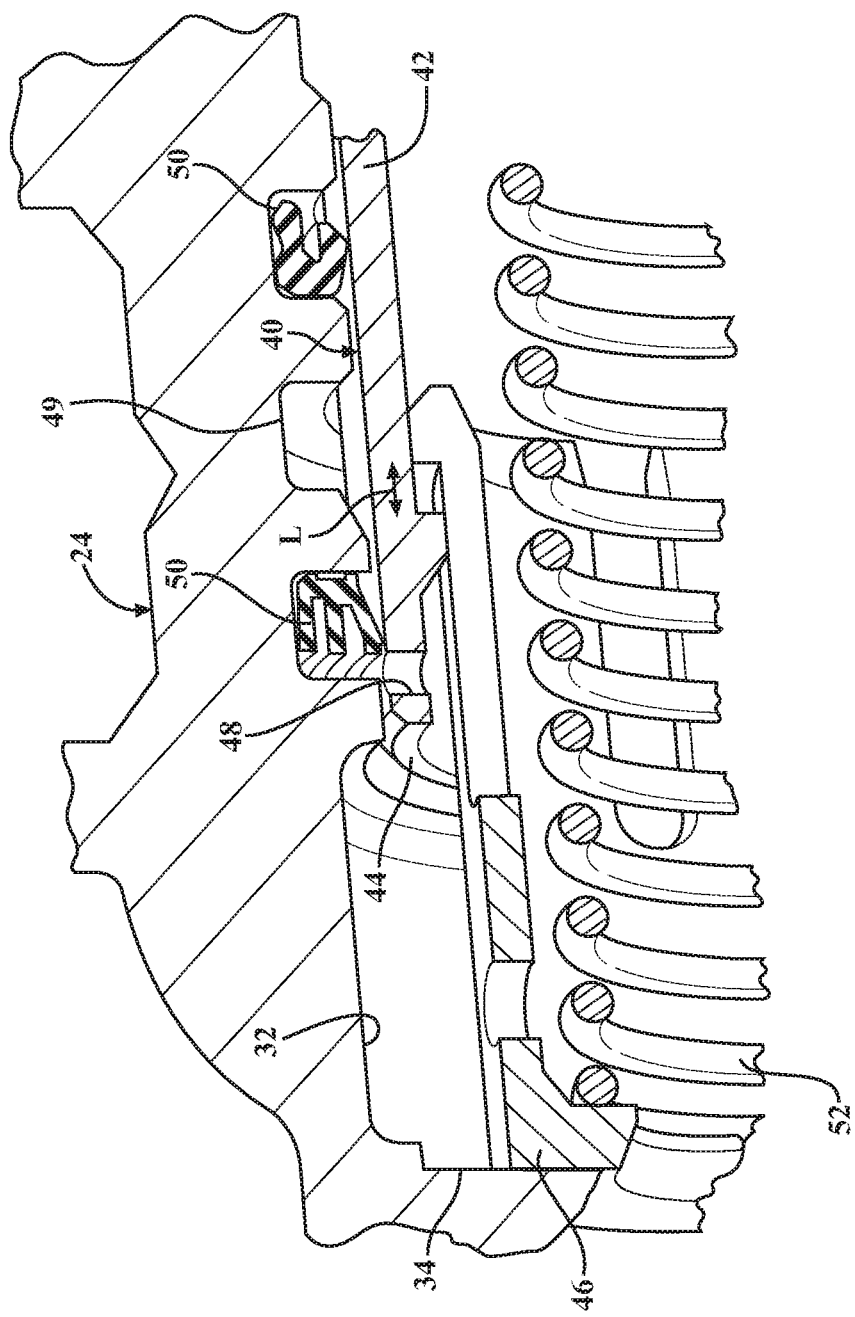
FIG. 6 is an enlarged view of a portion of FIG. 5.
Figure 7:
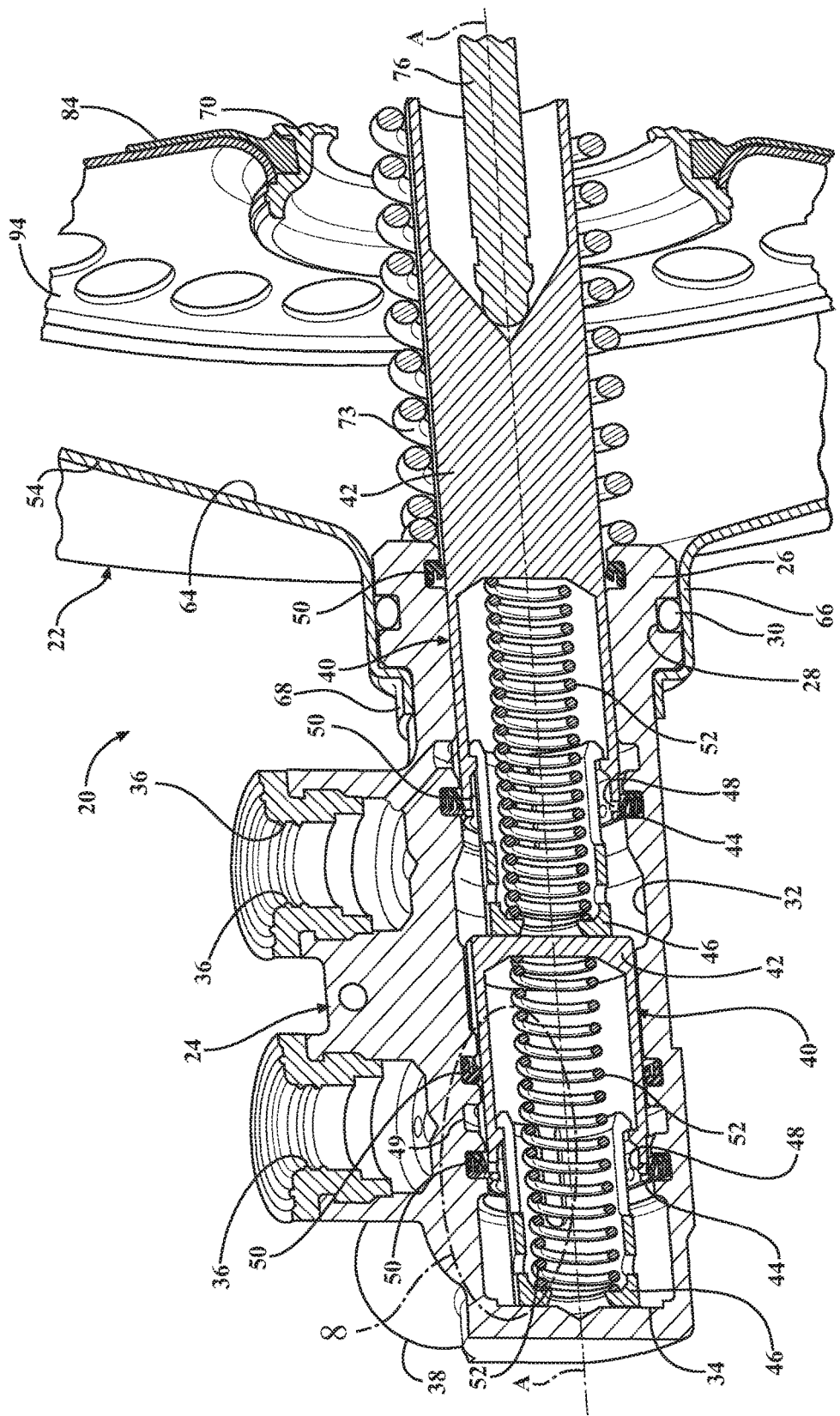
FIG. 7 is a fragmentary cross-sectional perspective view of the power brake assembly illustrating the master cylinder being secured to the brake booster.
Figure 8:
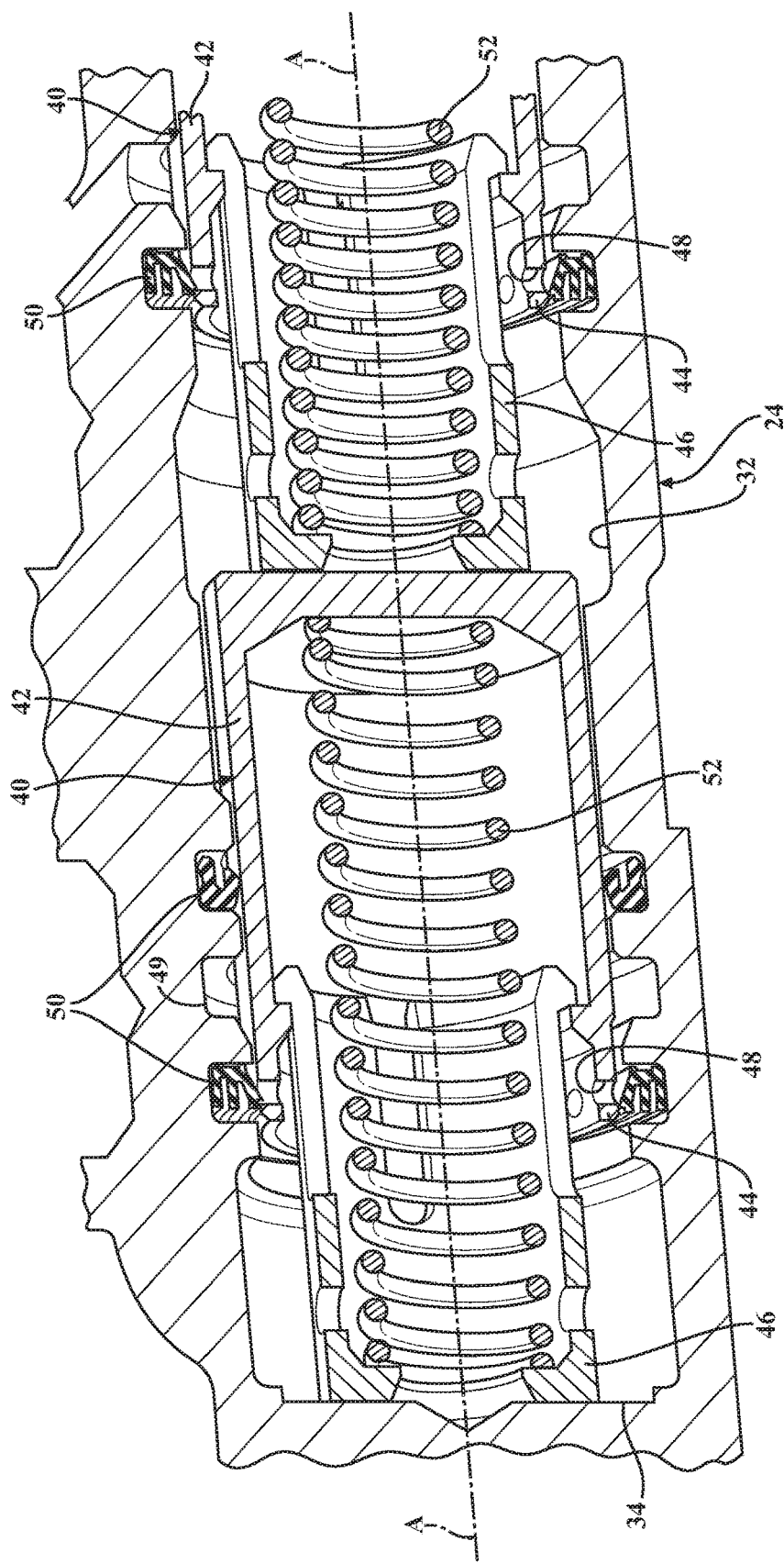
FIG. 8 is an enlarged view of a portion of FIG. 7.

A spring 52 is aligned on the axis A and extends between the piston 42 and the retainer 46 for biasing the piston 42 to an extended or resting position. In its fully extended or biased position, the spring 52 positions the at least one bypass aperture 48 next adjacent to the inlet port 49 for establishing an open condition of the master cylinder 24, which as illustrated in FIGS. 7 and 8, allows communication of the braking fluid from the reservoir port 36 and serially through the inlet port 49 and bypass aperture 48, about the retainer 46, and to the brake line port 38. Put another way, when the master cylinder 24 is disposed in the open condition, an open or unblocked line of fluid communication extends between the at least one reservoir 36 and the at least one brake inlet port 38. In response to sliding movement of the at least one piston 42 towards the bottom end 34 of the chamber 32, the bypass aperture 48 is axially advanced past the at least one gasket 50 to establish a pressurized condition, which as illustrated in FIGS. 5 and 6, prevents communication of braking fluid through the bypass aperture 48 from the reservoir port 36. Accordingly, the reservoir port 36 is closed or isolated from the chamber 32, which leads to pressurized fluid provided to the brake line port 38 for supply to the fluid actuated brakes. Although the aforementioned operation of the master cylinder 24 has been described with respect to a single controller 40, the master cylinder 24 may include two controllers 40 disposed in the chamber 32 working in tandem with one another as exemplary illustrated in FIG. 1.

The brake booster 22 has a front housing 54 and a rear housing 56 each having a cup shape disposed on the axis A and defining a space 58, 60, 62, 64 extending between the front housing 54 and the rear housing 56. The front housing 54 of the brake booster 22 includes a tubular collar 66 having a cylindrical shape extending outwardly from the front housing 54 along the axis A. The brake booster 22 further includes a power actuator 70 of tubular shape disposed in the space 58, 60, 62, 64 on the axis A and extending between a front end 72 and a rear end 74. The power actuator 70 is movable relative to the front housing 54 and the rear housing 56 along the axis A. The front end 72 of the power actuator 70 includes an output rod 76 extending outwardly from the front end 72 of the power actuator 70 along the axis A and toward the front housing 54 for engagement with the piston 42 of the master cylinder 24. An input rod 78 extends outwardly from the brake booster 22 along the center axis A and toward the brake pedal. An elastic member 73, such as a spring, or the like, is disposed in the front housing 54 and extends annularly about the input rod 78 and between the front end 72 of the power actuator 70 and the front housing 54 for engaging the master cylinder 24.

During braking, as an operator provides an input force via the brake pedal, the input rod 78 transfers the input force from the brake pedal to the output rod 76 and pushes the piston 42 of the master cylinder 24 along the axis A toward the bottom 34 of the master cylinder 24. As described above, in response to this sliding movement of the piston 42 towards the bottom end 34 of the chamber 32, the bypass aperture 48 is advanced axially past the at least one gasket 50 to establish a pressurized condition of the master cylinder 24 that prevents communication of braking fluid through the bypass aperture 48 from the reservoir port 36. Accordingly, the reservoir port 36 is closed or isolated from the chamber 32, which leads to pressurized fluid provided to the brake line port 38 for supply to the plurality of fluid actuated brakes. When the operator removes the input force, the spring 52 of the master cylinder 24 will act on the piston 42 to return master cylinder 24 to the open condition and the elastic member 73 will act on the output rod 76 of the power actuator 70 to return power actuator 70 to its original position.

Figure 2:
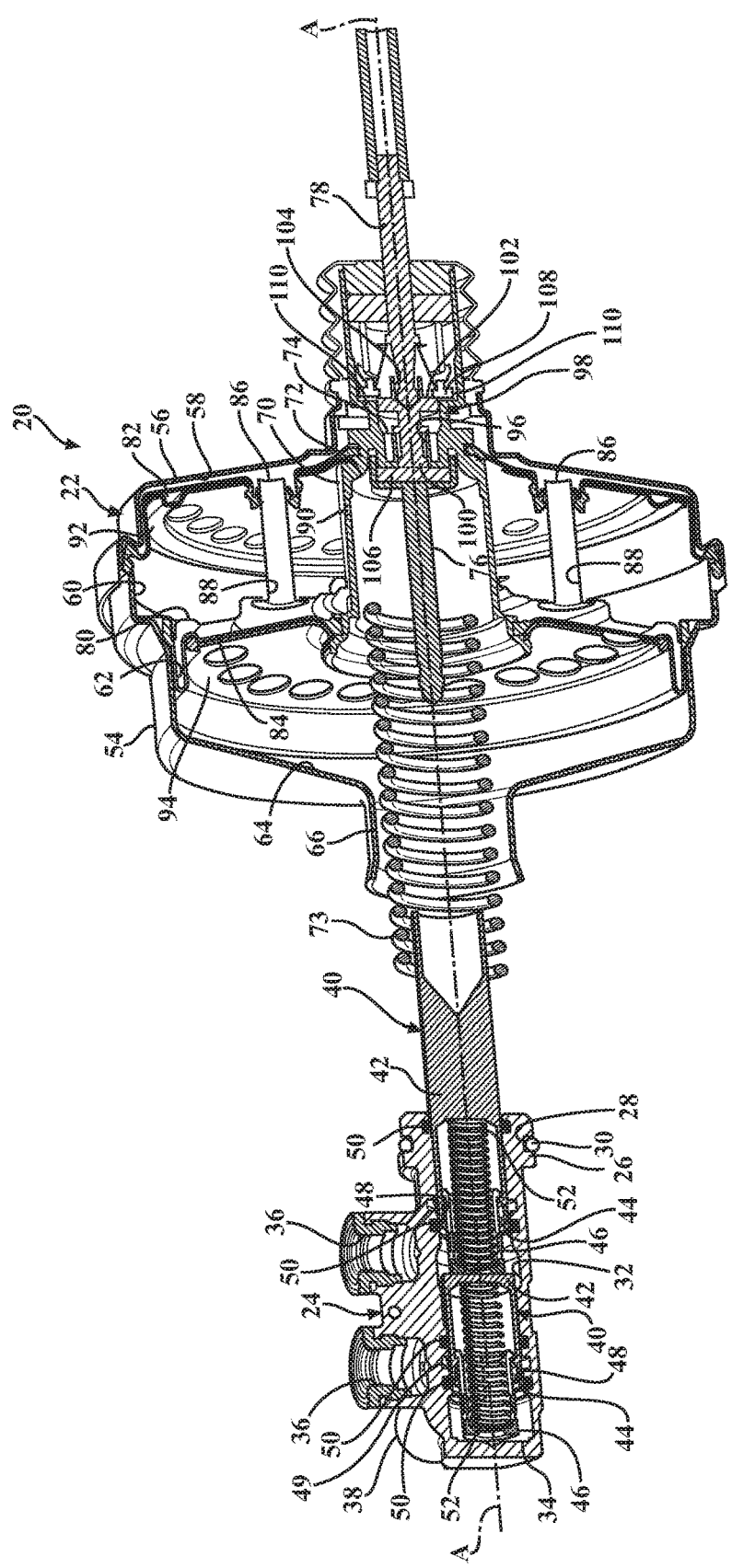
FIG. 2 is a cross-sectional perspective view of the power brake assembly including the master cylinder and the brake booster in its unassembled state.
Figure 3:
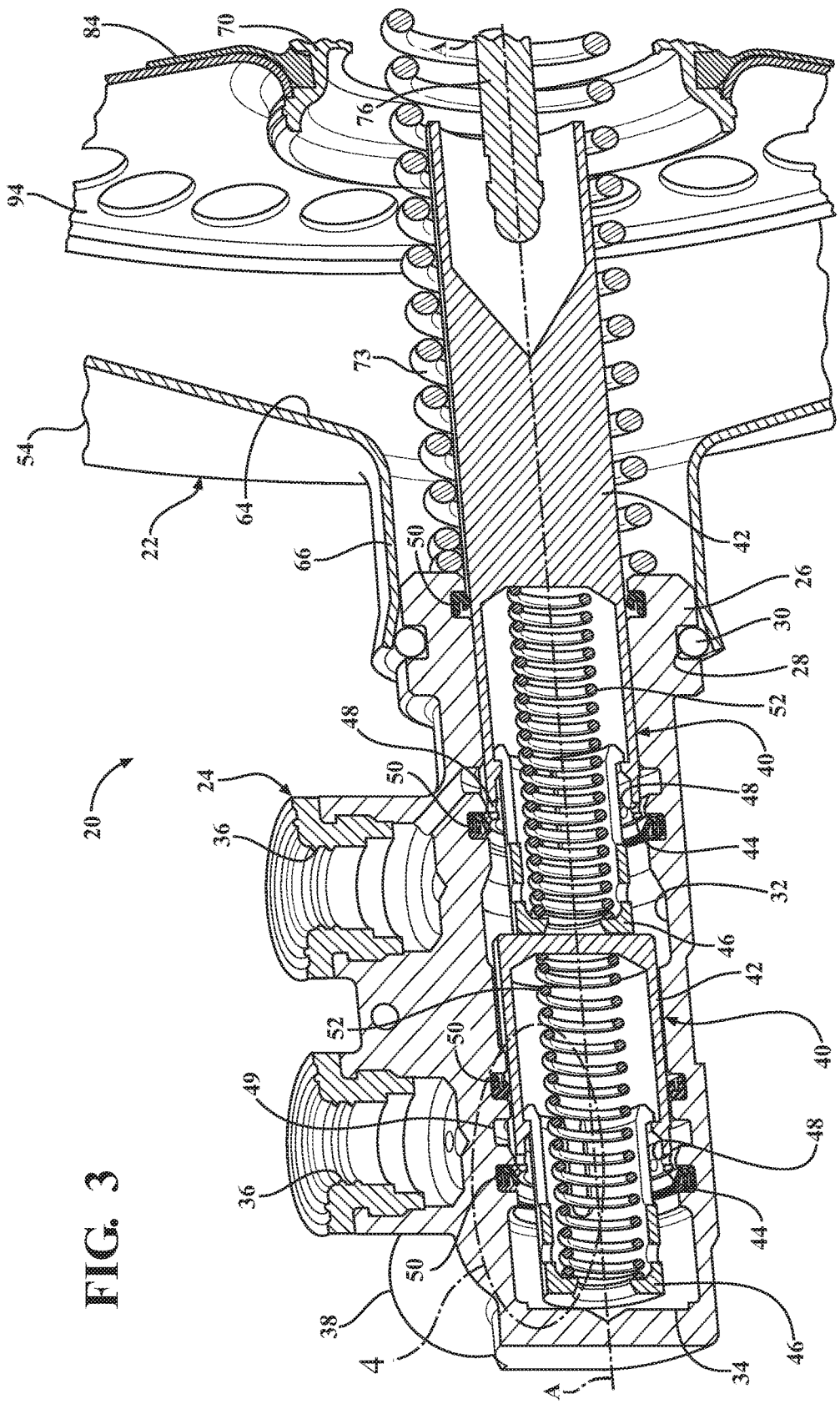
FIG. 3 is a fragmentary cross-sectional perspective view of the power brake assembly illustrating the step of inserting a radial shoulder the master cylinder into a tubular collar of the brake booster.
Figure 4:
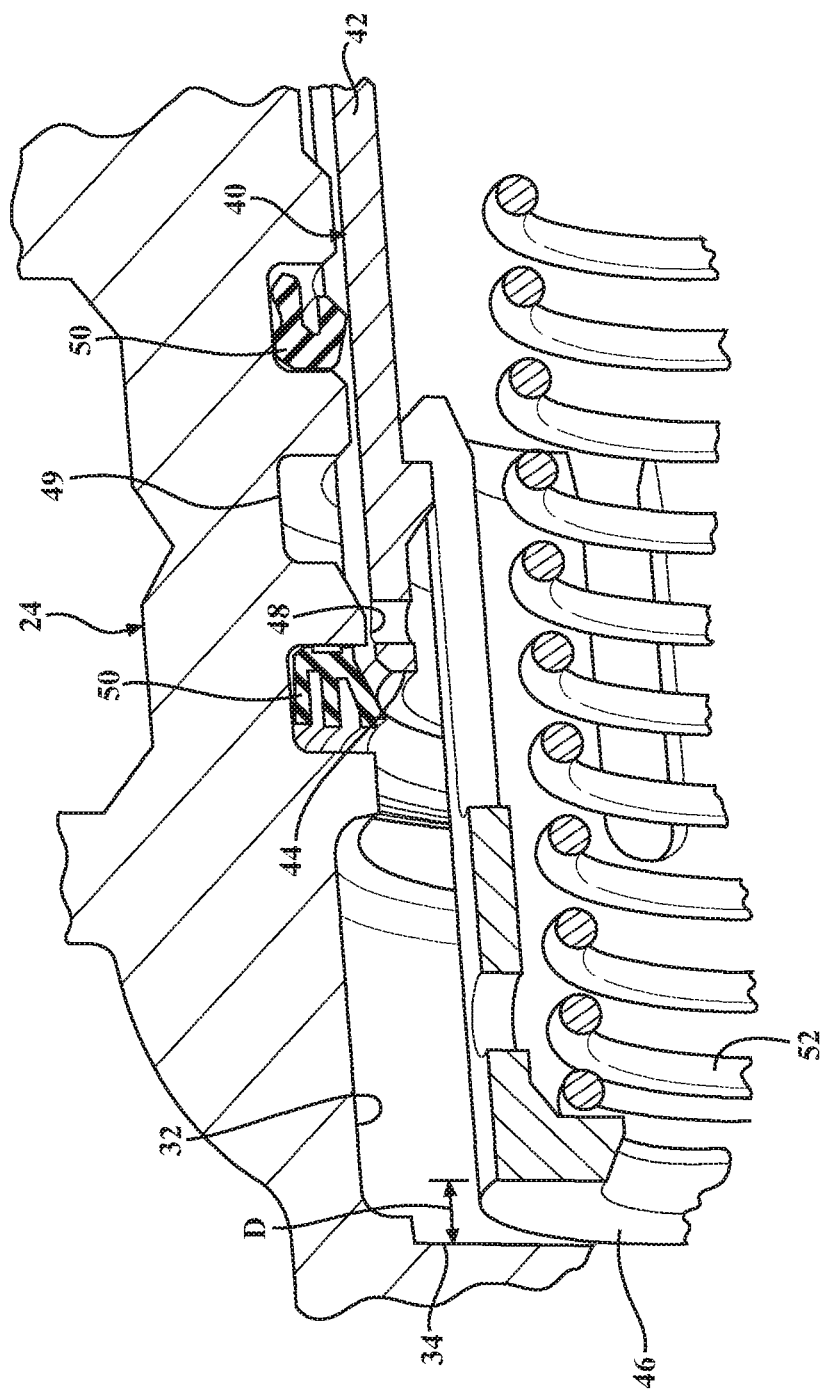
FIG. 4 is an enlarged view of a portion of FIG. 3.

As illustrated in FIG. 2, the method of assembling the power brake assembly 20 begins by inserting the radial shoulder 26 of the master cylinder 24 axially into the tubular collar 66 of the brake booster 22. As illustrated in FIG. 3, during the insertion step, the output rod 76 is axially aligned with the pistons 42 of the master cylinder 24. Once the radial shoulder 26 is partially inserted into the tubular collar 66, the method proceeds by monitoring for a pressure differential between the reservoir and brake inlet ports 36, 38. The fluid pressure differential between the brake line port 38 and the reservoir port 36 can be measured by sealing and applying a pressure at the brake line port 38 along with the sealing and measuring the pressure at the reservoir port 36 or vice versa. For example, a pressure generator, e.g. a compressed air supply apparatus, can be applied to one of the brake line port 38 or the reservoir port 36 of the master cylinder 24 to establish a fluid pressure within the chamber 32 and across the brake line port 38 and the reservoir port 36. It should be appreciated that the fluid pressure can be provided by gas (air) or liquid. In other words, instead of using a compressed air supply apparatus, a liquid supply apparatus may be used to apply the fluid pressure between the reservoir port 36 and the brake line port 38.

If no pressure differential exists between the reservoir and the brake inlet ports 36, 38, then this measurement provides an indication of the open condition of the master cylinder, which as illustrated in FIGS. 7 and 8, indicates that an open or unblocked line of fluid communication extends between the at least one reservoir 36 and the at least one brake inlet port 38. If a fluid pressure differential is detected between the reservoir and the brake inlet ports 36, 38, then this provides an indication of the pressurized condition of the master cylinder, which as illustrated in FIGS. 5 and 6, indicates that communication of braking fluid through the bypass aperture 48 is prevented or blocked by the at least one gasket 50 because the piston 42, and thus the at least one bypass aperture 48, has been advanced towards the bottom end 34 of the chamber 32 by abutting or engaging relationship with the output rod 76 of the brake booster 22.

So long as no pressure differential is detected between the at least one reservoir port 36 and the at least one brake inlet port 38, the master cylinder 24 continues to be axially inserted into the tubular collar 66 of the brake booster 22 and towards the output rod 76 of the brake booster 22. Once the piston 42 engages the output rod 76 of the brake booster 22, the output rod 76 pushes or slides the piston 42 axially towards the bottom 34 of chamber 32 of the master cylinder 24, compressing the spring 52 between the piston 42 and the retainer 46, to move the bypass aperture 48 of the piston 42 past the gasket 50, thereby closing the fluid communication between the brake line ports 38 and the reservoir ports 36. This movement of the piston 42 thus creates a fluid pressure differential between the brake line port 38 and the reservoir port 36. Once this pressure differential is sensed, the method proceeds by ceasing the insertion of the radial shoulder 26 of the master cylinder 24 axially into the tubular collar 66 of the brake booster 22.

As illustrated in FIGS. 5 and 6, a distance or length L of axial movement of the piston 42 establishes the change between the open condition of the master cylinder 24, in which no pressure differential is detected between the reservoir and brake inlet ports 36, 38, and the pressurized condition of the master cylinder 24, in which a pressure differential is detected between the reservoir and brake inlet ports 36, 38. Accordingly, after the pressure differential is detected and the axial insertion is ceased, the method proceeds by retracting or withdrawing the radial shoulder 26 of the master cylinder 24 from the tubular collar 66 of the brake booster 22 this distance or length L to re-establish the open condition of the master cylinder 24. Similar to the insertion step, a pressure differential between the reservoir port 36 and the brake inlet port 38 can also be monitored during the retraction step to determine when no pressure differential is detected between the reservoir and brake inlet ports 36, 38 and thus the piston has traveled this distance or length L to re-establish open condition of the master cylinder 24. In accordance with the aforementioned disclosure, the withdrawal step moves the master cylinder 24 away from the brake booster 22 to allow the spring 52 to return the piston 42, and thus reposition the bypass aperture 48, past the gasket 50 and back into fluid communication with the reservoir port 36 by way of the inlet port 49. Once no pressure differential is sensed because the open condition has been re-established, the method proceeds by ceasing the withdrawal of the radial shoulder 26 of the master cylinder 24 from the tubular collar 66 of the brake booster 22 to establish a position at which the master cylinder 24 is secured to the brake booster 22.

The subject method of assembling the power brake assembly thus reduces the distance or length L, known in the art as travel-to-close, by monitoring for a pressure differential between the at least one reservoir port 36 and the at least one brake line port 38 during assembly. Put another way, monitoring for a pressure differential during assembly allows for the precise placement of the master cylinder 24 relative to the brake booster 24 which sets the distance or length L at the smallest value possible. The reduced travel-to-close distance which is established for the assembled power brake assembly leads to minimized pedal travel and thus improved pedal feel for the operator of the vehicle. Another advantage of the subject method of assembling the power brake assembly is that only the tolerance of the master cylinder and the brake booster relative to one another need to be considered—not the tolerances of all possible combinations and components within the system.

In one embodiment of the method, the tubular collar 66 of the brake booster 22 is secured about the radial shoulder 26 of the master cylinder 24 by mechanically deforming, e.g. crimping, staking, or the like, the tubular collar 66 about the radial shoulder 26 of the master cylinder 24. Specifically, as best illustrated in FIG. 1, the subject method includes the step of crimping the tubular collar 66 about the master cylinder 24 to form a reduced neck 68 extending annularly about the shoulder 26 of the master cylinder 24 that prevents the movement of the master cylinder 24 in the tubular collar 66 of the brake booster 22. As illustrated in FIG. 1, the tubular collar 66 of the front housing 54 in the assembled position of the power brake assembly 20 extends annularly about the radial shoulder 26 of the master cylinder 24 and over the o-ring 30 of the radial shoulder 26 to define a sealed engagement between the master cylinder 24 and the brake booster 22. Alternatively, the tubular collar 66 of the brake booster can be mechanically fastened to the radial shoulder 26 of the master cylinder 24 through the use of bolts or screws, welding, or pinning.

Figure 9:
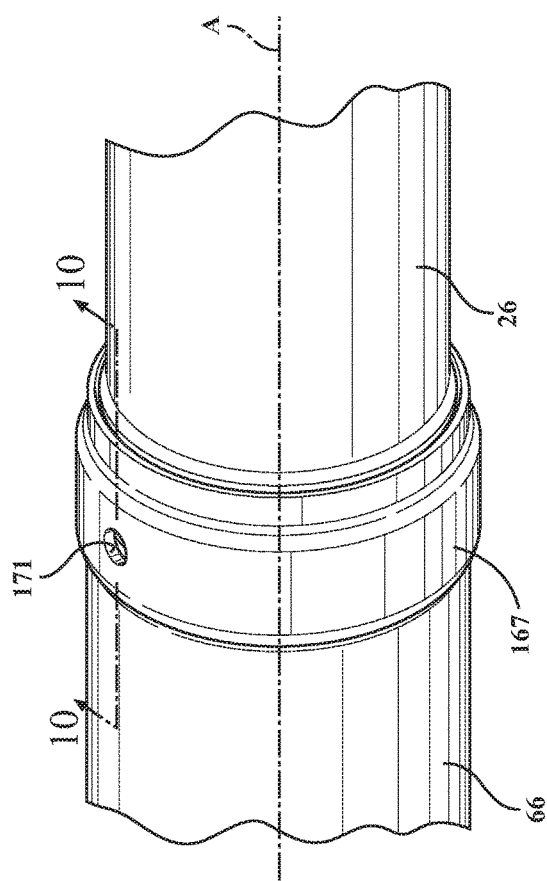
FIG. 9 is a fragmentary perspective view of an alternative arrangement of securing the master cylinder to the brake booster.
Figure 10:
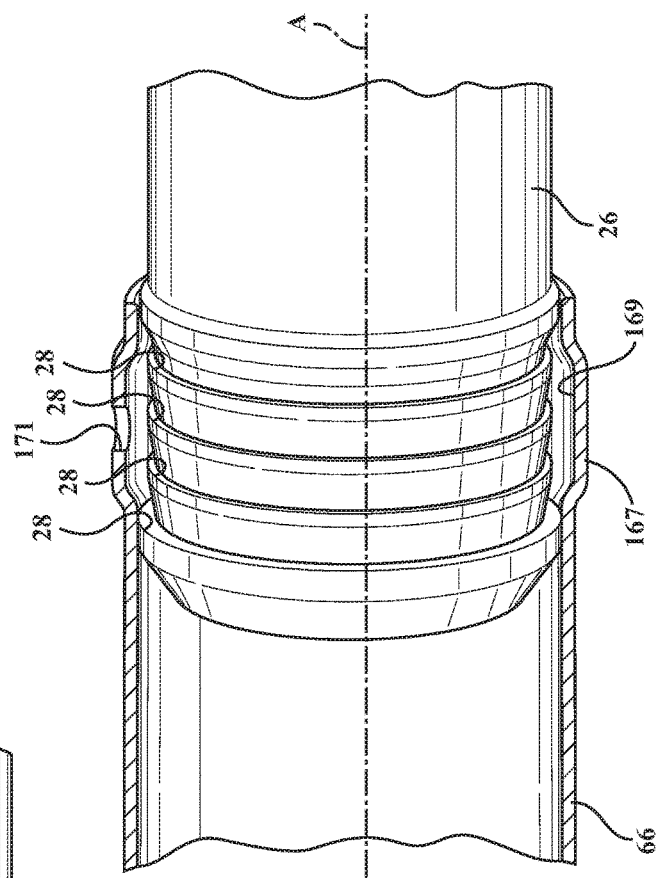
FIG. 10 is a fragmentary cross-sectional view taken along lines 10-10 of FIG. 9.

In another embodiment of the method, the brake booster 22 can be adhesively bonded to the master cylinder 24 by introducing a bonding material, e.g., an adhesive, welding, or the like, which flows and hardens by curing, between the radial shoulder 26 of the master cylinder 24 and the tubular collar 66 of the brake booster 22. For example, as best shown in FIGS. 9 and 10, the radial shoulder 26 of the master cylinder 24 defines a plurality of recesses 28 disposed spaced apart from one another and extending annularly about the axis A. The tubular collar 66 of the master cylinder 24 includes a bulging portion 167 extending radially outwardly from the tubular collar 66 and about the axis A and defining a void 169 extending annularly between the radial shoulder 26 of the master cylinder 24 and the bulging portion 167 of the brake booster 22. The budging portion 167 of the tubular collar 66 further includes a hole 171 disposed on the budging portion 167 and in communication with the void 169 for allowing the insertion of an adhesive bonding material to secure the master cylinder 24 to the brake booster 22.

In an embodiment of the subject method, once the radial shoulder 26 of the master cylinder 24 is at least partially inserted into the tubular collar 66 of the brake booster 22, a vacuum can be applied to the brake booster 22 to perform adjustment and compensation for different types of brake boosters 22. The vacuum tightens the front housing 54, the rear housing 56, the primary diaphragm 82, and the rear diaphragm 84 of the brake booster 22 resulting in a deflection of between 1-2 mm for the brake booster 22. For example, as illustrated in FIG. 1, the front housing 54 defines an inlet for connecting the brake booster 22 to a vacuum source. The brake booster 22 may include a vacuum check valve disposed between the vacuum source and the inlet for preventing air at atmospheric pressure from entering the brake booster 22 when the vacuum source is not operating.

As illustrated in FIG. 1, the brake booster 22 of the assembled power brake assembly 20 further includes a divider plate 80 of circular shape slidably attached to the power actuator 70 and partitioning the space 58, 60, 62, 64 into a primary control volume 58, 60 extending between the rear housing 56 and the divider plate 80 and a secondary control volume 62, 64 extending between the divider plate 80 and the front housing 54. A primary diaphragm 82 of circular shape and made from an elastomeric material is disposed in the primary control volume 58, 60 adjacent to the rear housing 56 and is attached to the power actuator 70 spaced apart from the divider plate 80 to partition the primary control volume 58, 60 into a primary apply compartment 58 and a primary vacuum compartment 60. A secondary diaphragm 84 of circular shape and made from an elastomeric material is disposed in the secondary control volume 62, 64 adjacent to the front housing 54 and is attached to the power actuator 70 spaced apart from the divider plate 80 to partition the secondary control volume 62, 64 into a secondary apply compartment 62 and a secondary vacuum compartment 64. A pipe 86 having a tubular shape extends between the divider plate 80 and the primary diaphragm 82 and defines a channel 88 disposed in fluid communication with both the primary apply compartment 58 and the secondary apply compartment 62. The power actuator 70 defines an air passage 90 connecting the primary vacuum compartment 60 and the secondary vacuum compartment 64 to allow the vacuum compartments 60, 64 to be always pressurized to below atmospheric pressure during operation. Alternatively, the air passage 90 may be defined on the divider plate 80 for connecting the vacuum compartments 60, 64 with one another for fluid communication (vacuum) therebetween.

A primary support plate 92 having a disc shape is disposed in the primary vacuum chamber 32 and is attached to the power actuator 70 abutting the primary diaphragm 82 to provide rigidity to the primary diaphragm 82. A secondary support plate 94 having a disc shape is disposed in the secondary vacuum chamber 32 and is attached to the power actuator 70 and abuts the secondary diaphragm 84 to provide rigidity to the secondary diaphragm 84.

The rear end 74 of the power actuator 70 defines a bore 96 of cylindrical shape extending along the center axis A. An air regulating mechanism 98, as generally indicated, is disposed in the bore 96 for allowing air at atmospheric pressure to enter the apply compartments 58, 62 of the brake booster 22. The air regulating mechanism 98 includes an air valve 100 having a spool-shape seated in the bore 96 of the power actuator 70 and extends along the center axis A between the output rod 76 and the input rod 78. The air valve 100 defines a receiving end 102 having a cavity 104 for engaging the input rod 78 of the brake booster 22. A reaction disc 106 of circular shape made from an elastomeric material is disposed on the front end 72 of the power actuator 70 and extends between the output rod 76 and the air valve 100 for transferring the motion of the air valve 100 to the output rod 76. The air regulating mechanism 98 further includes a floating control valve 108 of tubular shaped disposed adjacent to the air valve 100 for preventing air at atmospheric pressure from entering the brake booster 22 through the air valve 100. The rear end 74 of the power actuator 70 defines a valve seat 110 extending outwardly from the rear end 74 of the power actuator 70 and annularly about the axis A for engaging the floating control valve 108 of the air regulating mechanism 98.

In operation, when the brakes are at a rest position and no force is applied to the input rod 78, the vacuum source draws air out of the vacuum compartments 60, 64. With the air valve 100 holding the floating control valve 108 off the valve seat 110 of the power actuator 70, air is evacuated from the apply compartments 58, 62. The valve seat 110 is disposed on the floating control valve 108 preventing the entrance of air at atmospheric pressure into the rearward end of the power actuator 70, and into the apply compartments 58, 62. With the vacuum on both sides of the diaphragms 82, 84, the diaphragms 82, 84 are able to hold the power actuator 70 against the housing.

When a driver pushes the brake pedal, the input rod 78 displaces the air valve 100 and the floating control valve 108 forward along the axis A and toward the front housing 54 together until the floating control valve 108 contacts the valve seat 110 on the power piston 42. As the air valve 100 moves forward along the center axis A, it unseats itself from the floating control valve 108 and creates an opening between the air valve 100 and the floating control valve 108. When this occurs, the air at atmospheric pressure enters the apply compartments 58, 62 of the brake booster 22. Since there is still vacuum in the vacuum compartments 60, 64, a diaphragm pressure differential results in a forwardly directed operating force acting on each of the diaphragms 82, 84 connected to the power actuator 70. The operating force causes the power actuator 70 and the output rod 76 to move forwardly and move the piston 42 of the master brake cylinder 24.

As the hydraulic line pressure of the braking system increases during braking, the brake booster 22 provides a mechanical feedback force to the brake pedal through the air valve 100. The output rod 76 transmits the rearwardly directed force from the piston 42 of the master cylinder 24 to the reaction disc 106, which compresses and provides a response much like a highly compressed fluid. A portion of the total force from the master cylinder 24 is transferred to the air valve 100, the input rod 78, and finally to the brake pedal. This gives the driver a brake-apply feel, which is proportional to the degree of braking. This feedback also closes the air valve 100 and prevents any further increase in apply pressure until the driver pushes the brake pedal harder.

When the brake pedal is in a hold position, the floating control valve 108 stays in contact with the valve seat 110 of the power actuator 70 thereby shutting off the vacuum source to the apply compartments 58, 62. At the same time, the floating control valve 108 travels with power actuator 70 along the center axis A to reseat on the air valve 100 which prevents additional air from entering the apply compartments 58, 62. The air valve 100 and the floating control valve 108 remain stationary until the driver releases or applies more force to the brake pedal. Releasing all of the forces on the brake pedal allows power actuator 70 to return the diaphragms 82, 84 to the rest position.

Obviously, many modifications and variations of the present invention are possible in light of the above teachings and may be practiced otherwise than as specifically described while within the scope of the appended claims. It should be appreciated that the method disclosed in the present invention of assembling the power brake assembly 20 can be used to manufacture regular power brake assemblies as well as tandem power brake assemblies.

What is claimed is:

1. A method of assembling a power brake assembly including a brake booster and a master cylinder defining a chamber disposed between at least one reservoir port and at least one brake line port, the method comprising:
    inserting the master cylinder into the brake booster;
    monitoring for a pressure differential between the at least one reservoir port and the at least one brake line port of the master cylinder during said insertion step;
    ceasing the insertion of the master cylinder into the brake booster in response to sensing the pressure differential;
    withdrawing the master cylinder a distance from within the brake booster; and
    securing the brake booster to the master cylinder after withdrawing the master cylinder the distance.

2. The method as set forth in claim 1, further comprising:
    monitoring for an elimination of the pressure differential between the at least one reservoir port and the at least one brake line port of the master cylinder during said withdrawal step; and
    ceasing the withdrawal of the master cylinder from the brake booster in response to the elimination of the pressure differential to establish the distance.

3. The method as set forth in claim 2, wherein the brake booster includes a tubular collar and the master cylinder includes a radial shoulder, and wherein said insertion step includes axially inserting the radial shoulder into the tubular collar and said withdrawal step includes withdrawing the radial shoulder from the tubular collar the distance.

4. The method as set forth in claim 3, wherein the master cylinder includes a controller including a piston and a retainer disposed in telescoping relationship with one another within the chamber and the brake booster includes an output rod extending along an axis, and further including a step of axially aligning the piston and the output rod with one another during said insertion step.

5. The method as set forth in claim 4, wherein the piston defines a bypass aperture disposed adjacent to a distal end, and further including a step of biasing the piston to an extended position with a spring disposed between the piston and the retainer during said insertion step to establish an open condition of the master cylinder for allowing fluid communication serially through the at least one reservoir port, the bypass aperture, the chamber, and the at least one brake line port.

6. The method as set forth in claim 5, wherein the master cylinder includes at least one gasket disposed in the chamber and extending annularly about the piston next adjacent the bypass aperture, and further including a step of disposing the piston in abutting relationship with the output rod of the brake booster during said insertion step to compress the spring between the piston and the retainer and move the bypass aperture of the piston axially past the at least one gasket to establish a pressurized condition of the master cylinder for closing the serial communication and establishing the pressure differential sensed between the at least one reservoir port and the at least one brake line port during said monitoring steps.

7. The method as set forth in claim 6, further comprising a step of biasing the piston back to its extended position during said withdrawal step to re-position the bypass aperture past the at least one gasket and in communication with the at least one reservoir port for re-establishing the open condition of the master cylinder and establishing an eliminated pressure differential sensed between the at least one reservoir port and the at least one brake line port during said withdrawal step.

8. The method as set forth in claim 2, wherein said step of monitoring for the pressure differential and said step of monitoring for the elimination of the pressure differential include applying a pressure to one of the at least one reservoir port or the at least one brake line port, and monitoring for a pressure at the other of the at least one reservoir port or the at least one brake line port to determine if the applied pressure and the monitored pressure are different or equal.

9. The method as set forth in claim 8, wherein said step of applying a pressure to one of the at least one reservoir port or the at least one brake line port includes connecting a compressed air supply apparatus to one of the at least one reservoir port or the at least one brake line port.

10. The method as set forth in claim 8, wherein said step of applying a pressure to one of the at least one reservoir port or the at least one brake line port includes connecting a liquid supply apparatus to one of the at least one reservoir port or the at least one brake line port.

11. The method as set forth in claim 1, wherein the brake booster includes a tubular collar and the master cylinder includes a radial shoulder and said step of securing the brake booster to the master cylinder includes introducing a bonding material between the radial shoulder of the master cylinder and the tubular collar.

12. The method as set forth in claim 11, wherein the radial shoulder defines a plurality of recesses and the tubular collar includes a bulging portion which defines a void, and wherein said step of introducing the bonding material includes inserting the bonding material through a hole and between the recesses and the bulging portion to secure the master cylinder to the brake booster.

13. The method as set forth in claim 1, wherein the brake booster includes a tubular collar and the master cylinder includes a radial shoulder and said step of securing the brake booster to the master cylinder includes mechanically deforming the tubular collar about the radial shoulder of the master cylinder.

14. The method as set forth in claim 1, wherein the brake booster includes a tubular collar and the master cylinder includes a radial shoulder and said step of securing the brake booster to the master cylinder includes mechanically fastening the tubular collar to the radial shoulder of the master cylinder.

15. The method as set forth in claim 1, wherein the brake booster includes a front housing, a rear housing, a primary diaphragm, and a rear diaphragm, and further including a step of applying a vacuum to the brake booster during said insertion step to perform adjustment and tightening of the housings and diaphragms of the brake booster.

* * * * *